United States Patent
Hiddema

(10) Patent No.: US 7,703,699 B2
(45) Date of Patent: Apr. 27, 2010

(54) DEVICE FOR CONTROLLING THE MOVEMENT OF AN OUTWARDLY EXTENDING BEAM ON AN AGRICULTURAL MACHINE

(75) Inventor: Joris Hiddema, NB Blerick (NL)

(73) Assignee: John Deere Fabriek Horst B. V., Horst (NL)

( * ) Notice: Subject to any disclaimer, the term of this patent is extended or adjusted under 35 U.S.C. 154(b) by 409 days.

(21) Appl. No.: 11/625,387

(22) Filed: Jan. 22, 2007
(Under 37 CFR 1.47)

(65) Prior Publication Data

US 2008/0029616 A1 Feb. 7, 2008

(30) Foreign Application Priority Data

Jan. 24, 2006 (DE) .................. 10 2006 003 544

(51) Int. Cl.
*B05B 1/20* (2006.01)
*B05B 3/02* (2006.01)
*B05B 3/14* (2006.01)
*F16F 9/18* (2006.01)
*B60G 11/14* (2006.01)
*F16M 1/00* (2006.01)

(52) U.S. Cl. .................. 239/167; 239/161; 239/166; 239/176; 267/124; 267/248; 248/654

(58) Field of Classification Search .............. 239/146, 239/159, 160, 161, 164, 166, 167, 176; 248/900, 248/654; 267/124, 248

See application file for complete search history.

(56) References Cited

U.S. PATENT DOCUMENTS

| | | | | |
|---|---|---|---|---|
| 3,357,642 A | * | 12/1967 | Horton | 239/159 |
| 3,581,993 A | * | 6/1971 | Reams | 239/167 |
| 4,197,999 A | * | 4/1980 | Lammers | 239/166 |
| 4,288,034 A | | 9/1981 | Widmer et al. | |
| 4,595,140 A | * | 6/1986 | Harden et al. | 239/167 |
| 5,000,385 A | | 3/1991 | Trusty et al. | |
| 5,348,226 A | * | 9/1994 | Heiniger et al. | 239/1 |
| 5,957,383 A | | 9/1999 | Benest | |
| 6,334,492 B2 | | 1/2002 | Hundeby | |
| 6,343,661 B1 | * | 2/2002 | Thompson et al. | 172/444 |

FOREIGN PATENT DOCUMENTS

| | | |
|---|---|---|
| DE | 29 44 944 | 6/1980 |
| DE | 32 04 189 | 8/1983 |
| DE | 37 39 305 | 6/1989 |
| EP | 0429 934 | 11/1990 |

* cited by examiner

*Primary Examiner*—Dinh Q Nguyen
*Assistant Examiner*—Ryan Reis

(57) ABSTRACT

A beam (16) such as a spray bar of an agricultural sprayer (10) is pivotable about an axis (22) into an operating position. In the operating position, the bar is in contact with a stop (28) located on a two-legged lever (30), one leg (42) of which is acted upon by the beam (16) and the other leg (44) of which is acted upon by a energy storing mechanism (34).

10 Claims, 3 Drawing Sheets

DEVICE FOR CONTROLLING THE MOVEMENT OF AN OUTWARDLY EXTENDING BEAM ON AN AGRICULTURAL MACHINE

FIELD OF THE INVENTION

The invention relates to a device for controlling the movement of a beam or boom structure extending transversely to the direction of travel of an agricultural machine, and more specifically to a sprayer boom pivotable about an axis until it comes to rest against a stop and an agricultural sprayer having such a device.

BACKGROUND OF THE INVENTION

Known agricultural spray devices have a central beam or support holding a horizontally pivoting boom or spray bar at each side. The spray bar is normally pivoted by a hydraulic motor between a transport position and a spray position wherein the lateral spray bar comes to rest against the middle spray bar or support in the spray position. As the sprayer moves over ground irregularities in a field, the entire spray bar moves about a central vertical axis or each lateral spray bar moves independently of the other about its particular axis.

The problem on which the present invention is based is that the spray bar movements are relatively large and have a negative effect on spraying precision. The movements are still prevalent, even when the spray bar is supported from the main sprayer frame by an intermediate cushion support or when a resilient pad is provided between the stop and the pivoting member. This problem as well as the problem of increasing shock forces is amplified as spray boom length increases. Shock absorbent pads do not have sufficient cushioning effect, especially for large booms.

SUMMARY OF THE INVENTION

A device for controlling the movement of an outwardly extending beam or boom section of an agricultural machine such as a sprayer includes a stop that can be moved under the influence of the beam as the beam pivots about an axis. A lever, energy storage device and/or shock absorber is used to provide dynamic dampening and shock absorption in a relatively compact and inexpensive package even when used on a long structure such as a large sprayer boom section. In this way, movement of the spray bar beyond the actual spray position can be cushioned and not reflected without being damped. This reduces the moments in the spray bar about the axis. This machine may be a field sprayer, a vegetable conveyor belt or the like.

If the stop is formed on a two-legged lever, the required counterforce can be influenced through the choice of the length of the legs. Likewise, the entire device can be designed to be more or less sensitive. The stop may be provided on both the long leg and the short leg.

The hold-down force on the beam may be applied mechanically, e.g., by spiral springs, plate springs or disk springs, depending on requirements.

A shock absorber is provided to prevent the energy storing mechanism, e.g., a spring, and with it the spray bar from becoming unstable.

If the legs of the lever are of different lengths, the force with which the beam is stopped and returned can be varied via the length ratio, and, associated with that, the position of the pivot axis. If the stop is located on the shorter leg, this means that a high force may be absorbed with a low force.

Although the beam could also be returned manually to its spray position, an adjustment by means of a hydraulic motor or the like and the associated control option is more advantageous, especially since it can be initiated by a tractor.

If the motor actuator itself is provided internally with a energy storing mechanism, e.g., a mechanical spring or a gas accumulator, or if it acts on a frame via such a device, it can apply the beam to the stop under prestress and thus reliably keep it in its operating position. If several motor actuators with energy storing mechanisms are provided, each may be designed as a motor actuator acting on two sides and as a common energy storing mechanism. With a leg length ratio of 1:2 to 1:4, preferably 1:2.5, it is possible to design the energy storing mechanism for the stop so that it can still be accommodated well spatially. Likewise, instead of the legs, two cylinders having different piston cross sections may also be connected in series.

Agricultural sprayers having a spray bar 30 to 60 meters or more long are subject to great pivoting movements that can be absorbed to great advantage with a device according to one or more of above claims.

An exemplary embodiment of the present invention is illustrated in the drawings and explained in greater detail below.

DESCRIPTION OF THE PREFERRED EMBODIMENT

Figure 1:
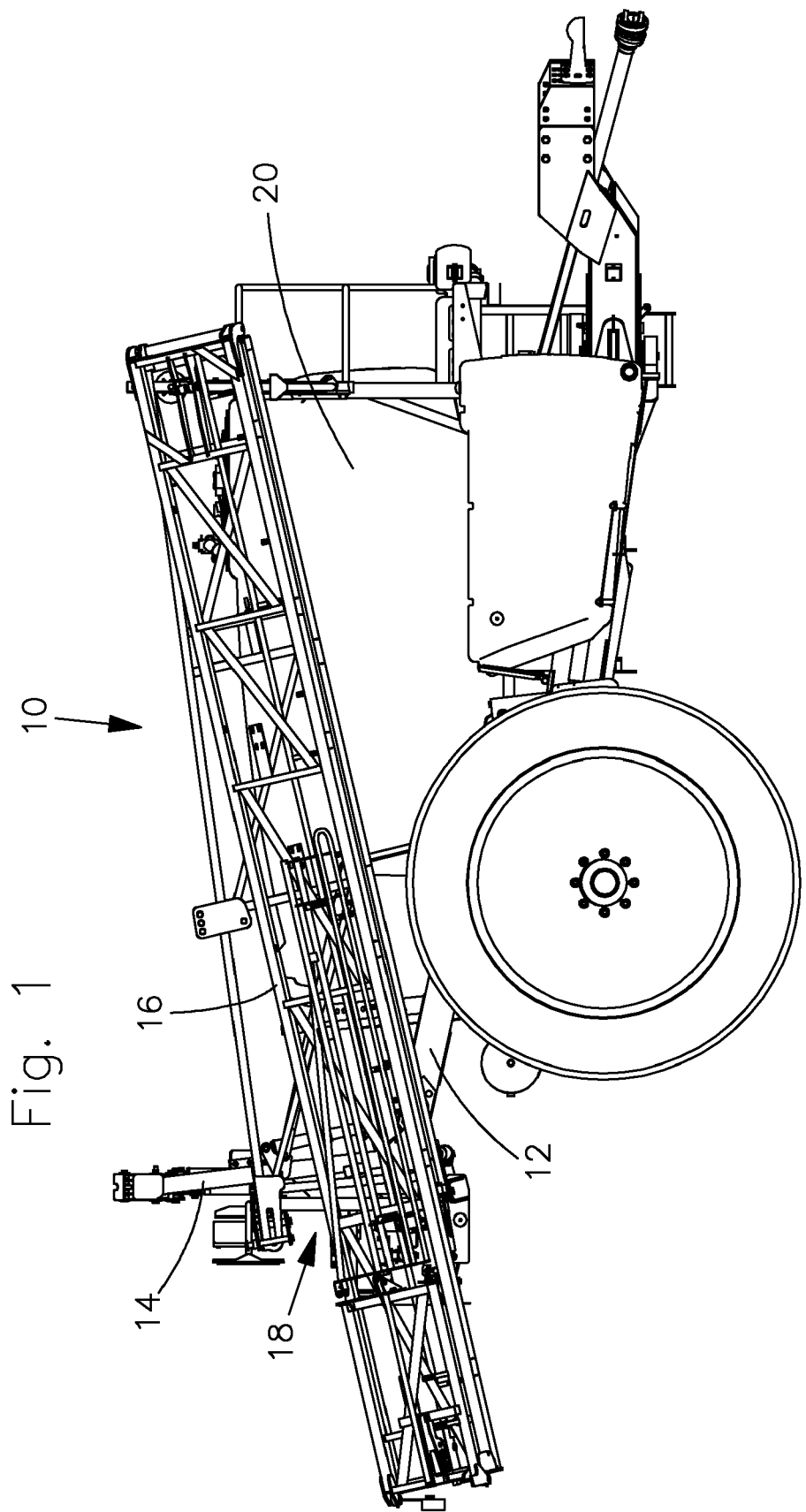
FIG. 1 is a side view of an agricultural sprayer having folding boom structure with a control device for controlling the movement of a beam.

An implement such as a sprayer 10 illustrated in FIG. 1 includes a frame 12, a suspension 14, a beam 16 and a device 18 for controlling the movement of the beam 16. The sprayer 10 is shown as a towed sprayer, which can be towed forwardly in the direction of a hitch over a field behind a tractor or the like. It could equally well be connected to the three-point linkage of a tractor or designed as a self-propelled sprayer.

A frame 12 supports a tank 20 and is equipped with an aft vertical adjustable support 14 which supports the beam 16 so it is vertically adjustable and, if necessary, is provided with devices (not shown) for controlling the absolute and relative heights. The suspension 14 has a pivot 22 defining a pivotal axis on each side aligned essentially vertically. In an area situated toward the longitudinal central plane of the sprayer 10, there is a holder 23 which may be designed as a strap or the like.

The beam 16 in this exemplary embodiment comprises a spray bar or boom, which has bearing journals 24 on an interior end area of the boom. The journals 24 are pivotally accommodated on the pivot 22 so that the beam 16 can pivot approximately 90° about the pivot axis between a storage position extending generally in the direction of travel and a working position extending generally transverse to the direction of travel. The length of the beam 16 may be ten meters or more, for example, so that during operation the sprayer 10 will experience significant pivoting movements on its freely cantilevered end due to accelerations. The beam 16 has a frame part 25 rigidly mounted in the area of the journals 24. The frame part 25 may also be adjustable relative to the beam 16.

The device 18 is mounted on the suspension 14 and includes a frame 26, a stop 28, a two-legged lever 30, a bearing 32, an energy storing mechanism 34, a shock absorber 36, a motor actuator 38 and a energy storing mechanism 40.

The purpose of the device 18 is to keep the beam 16 in its operating position extending transverse to the direction of travel and to dampen movements of the beam 16 as it pivots forwardly and rearwardly about the axis of the pivot 22. Since a beam 16 is mounted on each side of the suspension 14, a device 18 is preferably provided on each side.

Figure 3:
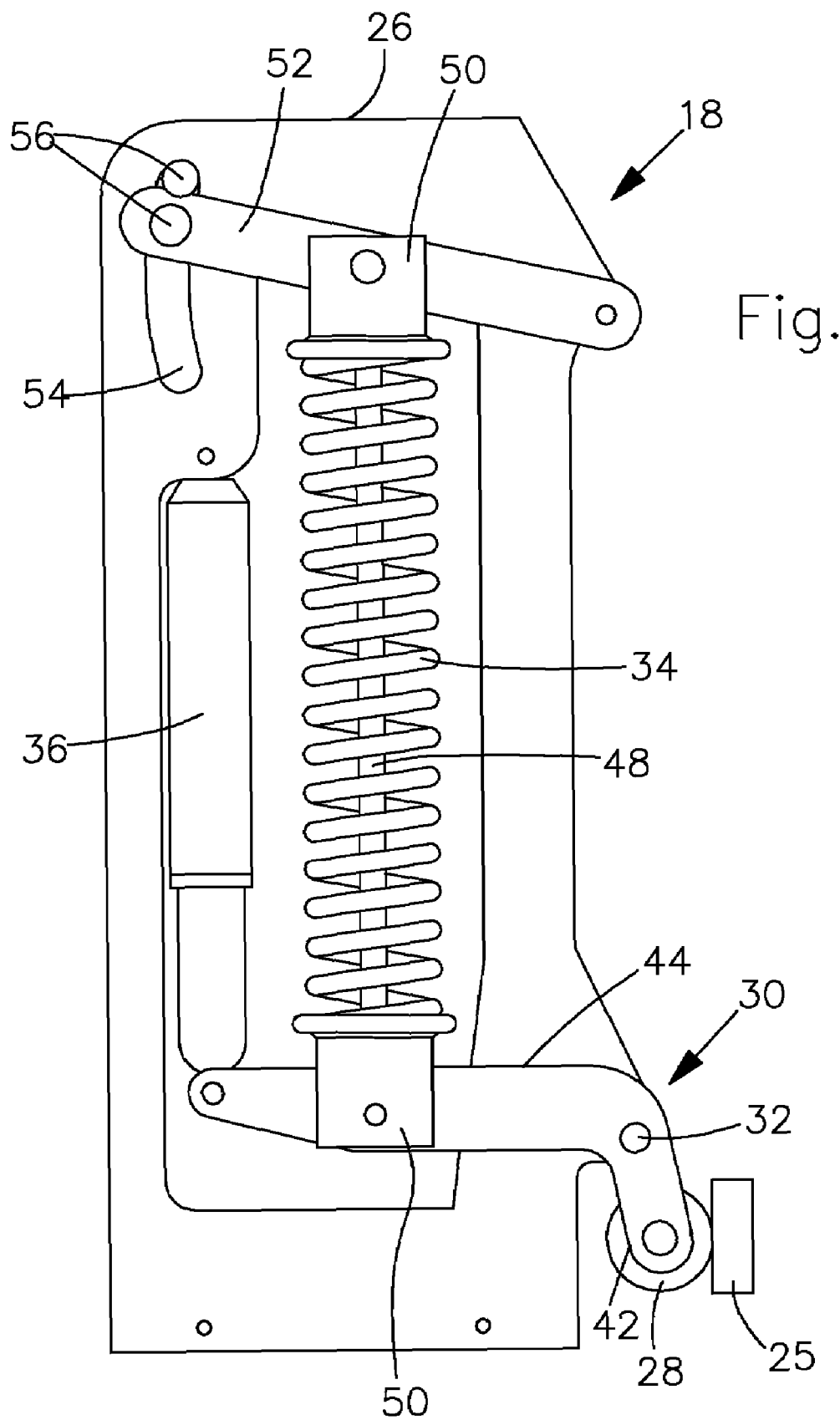
FIG. 3 is a rear view of the device of FIG. 2.

The frame 26 is designed with a cage-like welded assembly (FIG. 3) which may encompass the device 18 as a structural unit and may be mounted on the suspension 14. Alternatively, the device 18 may be mounted on the beam 16 instead of on the suspension 14.

In this exemplary embodiment, the stop 28 is designed as a roller mounted on a screw and supported on the lever 30. The stop 28 is designed and arranged so that the frame part 25 rests against the stop when the beam 16 is in its extended operating position. The roller axis of the stop 28 extends in the direction of travel.

The lever 30 is designed from two identical parallel spaced parts. The two parts are joined together to form a rigid unit defining a short leg 42 and a long leg 44. At the point of intersection of the legs, a pivot axis in the form of the bearing 32 also extends in the direction of travel. The stop 28 is situated in the free end area of the short leg 42. The short leg 42 extends more or less vertically and transverse to the direction of movement of the beam 16 about the pivot 22. The long leg 44 extends at approximately a right angle to the short leg 42 in this exemplary embodiment, but the actual relative orientation of the legs can be selected according the particular environment in which the device 18 is situated. In the embodiment shown, the length ratio of the two legs is 1:2.5, where the length is understood to refer to the distance between the acting force lines and the bearing 32.

The energy storing mechanism 34 is shown as a helical compression spring which is supported at a lowermost end on the long leg 44 and at a top end on the frame 26. A screw or link 48 extends through the spring to compress the energy storing mechanism 34 and limit the downward pivoting of the long arm 44 when the frame part 25 is moved away from contact with the stop 28. The link 48 extends through brackets or fork elements 50 with conical spring support members (not shown) between the frame 26 and to the long leg 44. The link 48 can slide through one of the brackets 50 to allow the spring 34 to compress when the frame part 25 moves against the stop 28. The lower bracket 50 is connected at a location between the bearing 32 and the opposite end of the leg 44. The pre-compression of the energy storing mechanism 34 is controlled by a pivot lever 52 having a free end movable within a bearing slot 54. The position of the free end within the slot can be varied by means of an adjusting device 56 to change the location of the top bracket 50 and thereby vary the spring compression to adjust the device 18 for different beams 16 and different operating conditions.

The shock absorber 36 extends parallel to the effective axis of the energy storing mechanism 34 and is connected to the lever 30 for operating either in tension or pressure, depending upon the direction of movement of the lever. The shock absorber is connected at the bottom to the lever 30 at a location opposite the bearing 32 and at the top to the frame 26. The shock absorber 36 acts on changes in speed and dampens and reduces the movements of the energy storing mechanism 34. Both the energy storing mechanism 34 and the shock absorber 36 act in a vertical plane and act essentially at a right angle to the long leg 44 and provide a mechanical advantage about the bearing 32 in a compact package.

Figure 2:
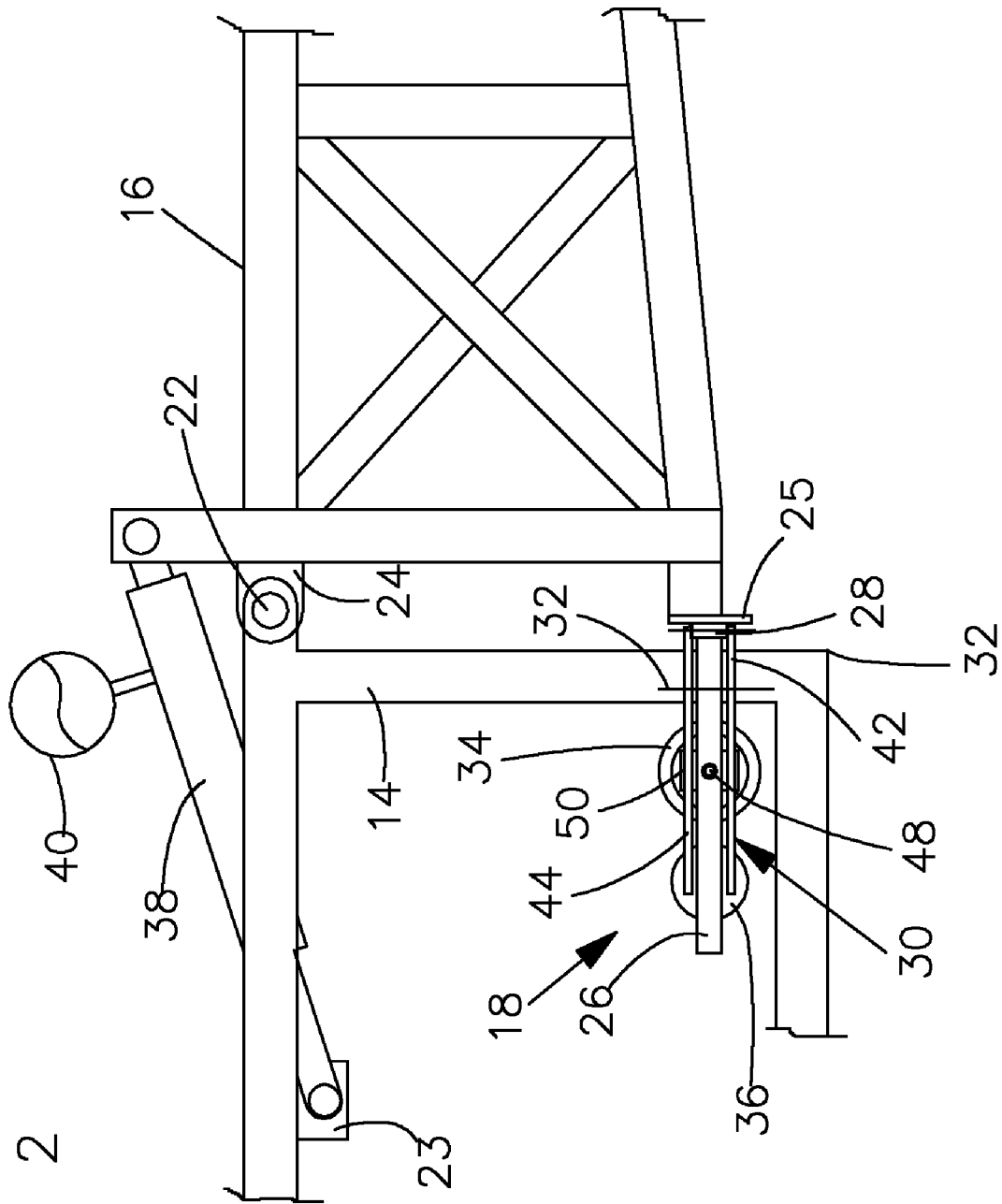
FIG. 2 is a top view of the control device.

The motor actuator 38 (FIG. 2) is designed as a double acting hydraulic cylinder pivotally connected at one end to the holder 23 and at the other end to the beam 16. The motor actuator 38 is connected to the energy storing mechanism 40 in fluid communication with the cylinder piston so that it yields to a slight extent in each position of the motor actuator 38. The motor actuator 38 could equally well be mounted on the holder 23 via a spring. As shown in FIG. 2, the energy storing mechanism 40 is designed as a gas pressure accumulator.

In operation, to bring the beam(s) 16 into an operating position, the motor actuators 38 are extended, with the frame part 25 resting against and held by the stop 28 at the end of the stroke. In this position of frame part 25 and stop 28, the energy storing mechanism 40 in cooperation with the motor actuator 38 acts on the frame part 25 at one end and thus on the beam 16, while at the other end the stop 28 exerts a force on the frame part 25 under the tension of the energy mechanism 34. For example, if the beam 16 is moved rearwardly because of an acceleration of the sprayer 10 and inertia of the beam 16, the beam 16 pivots about the axis of the pivot 22 and presses the frame part 25 against the stop 28. The stop 28 pivots with the short leg 42 about the bearing 32, and the long leg 44 moves against the energy storing mechanism 34 and the shock absorber 36. On the basis of the leverage ratio due to the different dimensions of the legs 42 and 44, the counterforce of the energy storing mechanism 34, which is compact in size, has the effect of forcing the beam 16 back.

Having described the preferred embodiment, it will become apparent that various modifications can be made without departing from the scope of the invention as defined in the accompanying claims.

The invention claimed is:

1. In an agricultural machine adapted for movement in a forward direction over irregular ground surfaces, a device for controlling the movement of a beam that extends transversely to the forward direction of the machine and is pivotable about an upright axis, the device including a frame part movable in a path with pivoting of the beam, a stop member supported in the path and contacting the frame part as the beam pivots for limiting the pivoting of the beam, a pivoting arm structure supporting the stop member for pivoting about a pivot axis, an energy storage member connected to the arm structure and biasing the stop member against the frame part for yieldingly biasing the beam to a pivoted position and cushioning movements of the beam as the agricultural machine travels over the irregular ground surfaces;

wherein the pivoting arm structure includes first and second legs offset on opposite sides of the pivot axis;

wherein the first and second legs are of differing effective lengths, and the stop member is connected to the first leg and the energy storage member is connected to the second leg; and wherein the first leg is substantially shorter than the second leg so that a movement of the first leg a first distance results in movement of the second leg a second distance greater than the first distance.

2. The device as set forth in claim 1 wherein the first and second legs are offset at approximately a right angle to each other, and the movement of the second leg is generally transverse to the movement of the first leg as the stop member moves against the frame part.

3. The device as set forth in claim 1 further including a frame assembly supporting the pivoting arm structure and the energy storage member, and an adjustment member supported from the frame assembly for adjusting the energy storage member relative to the pivoting arm structure.

4. The device as set forth in claim 1 including a frame assembly supporting the pivoting arm structure and the energy storage member, wherein the energy storage member comprises a spring compressed between the frame assembly and the second leg, and wherein the adjustment member includes a lever supported on the frame assembly and connected to one end of the spring.

5. The device as set forth in claim 4 further including a dampening member extending between the pivoting arm structure and the frame.

6. The device as set forth in claim 4 wherein the energy storage member comprises a spring extending generally parallel and adjacent to the dampening member, and wherein the spring and dampening member extend transverse to the path of the frame part.

7. The device as set forth in claim 6 wherein the spring acts in an upright plane out of interfering relationship with the beam as the beam pivots.

8. The device as set forth in claim 1 further including an actuator connected to the beam for pivoting the beam and an accumulator member connected the actuator, the actuator, accumulator member, and energy storage member yieldingly holding the beam in a pivoted position and permitting movement to and from the pivoted position about the upright axis.

9. The device as set forth in claim 8 wherein the actuator comprises a hydraulic cylinder acting generally in a horizontal plane, and wherein the energy storage member acts in an upright plane generally at a right angle to the path of the frame part.

10. The device as set forth in claim 9 wherein the energy storage member comprises an upright spring, and further comprising a shock absorber connected to the pivoting arm structure and extending generally parallel to the upright spring.

* * * * *